A. MOON.
VEHICLE WHEEL.
APPLICATION FILED JUNE 18, 1913.

1,107,982.

Patented Aug. 18, 1914.

Witnesses
Christ Feinle Jr.,
James A. Koehl

Inventor,
Arch Moon.
By Victor J. Evans,
Attorney.

UNITED STATES PATENT OFFICE.

ARCH MOON, OF FALLON, NEVADA.

VEHICLE-WHEEL.

1,107,982.   Specification of Letters Patent.   Patented Aug. 18, 1914.

Application filed June 18, 1913. Serial No. 774,427.

*To all whom it may concern:*

Be it known that I, ARCH MOON, a citizen of the United States, residing at Fallon, in the county of Churchill and State of Nevada, have invented new and useful Improvements in Vehicle-Wheels, of which the following is a specification.

This invention relates to vehicle wheels and particularly to an improvement over the form of wheel shown in my Patent No. 1,053,852 of Feb. 18, 1913, an object of the present invention being the provision of telescopic resilient spokes between the felly and hub; grouped in pairs and arranged so that the spokes forming one pair extend at an opposite tangent from the hub to the spokes of a companion pair, thus forming substantially torquewise braces which reduce the shocks incident to a sudden application of the clutch, change of speed, etc., and effecting such sustaining means that will positively prevent collapse of the wheel under unreasonable loading of the vehicle, and further the provision of strong and durable means for bracing the companion spokes of each pair with each other.

With the above and other objects in view, the invention consists of certain novel features of construction, combination and arrangement of parts as will be hereinafter described and claimed.

Figure 1:
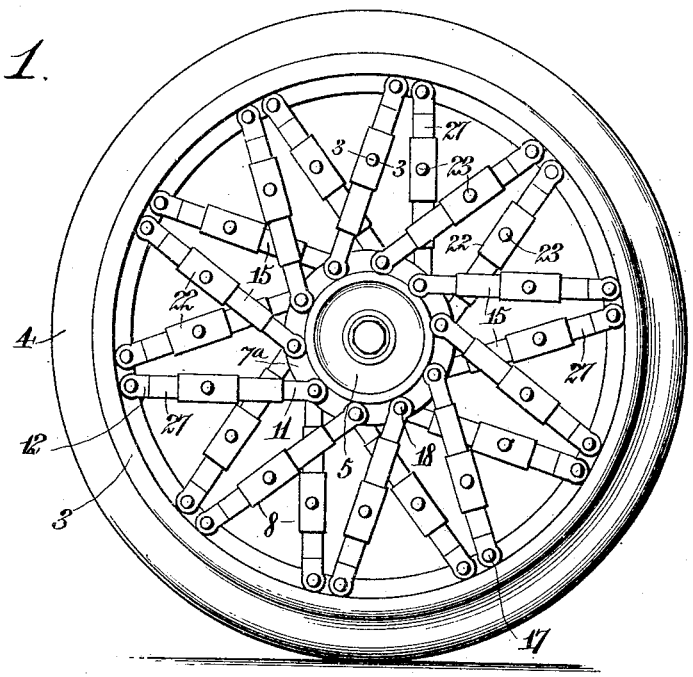
Figure 2:
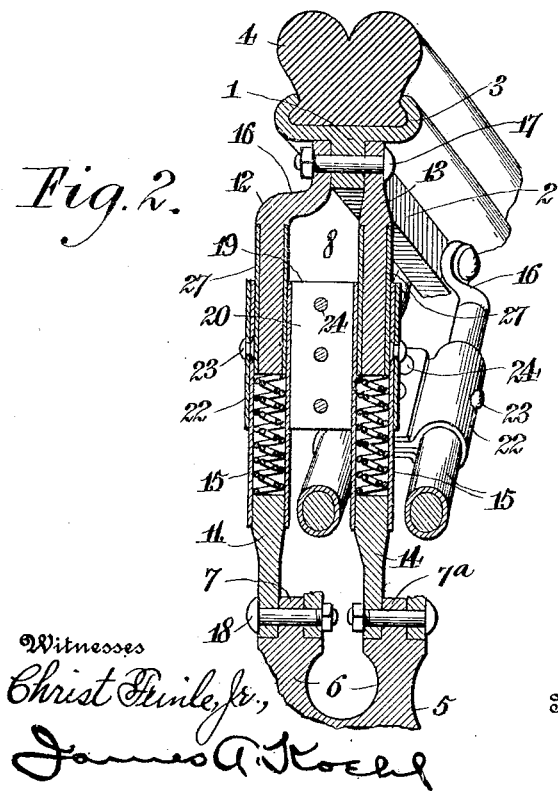
Figure 3:
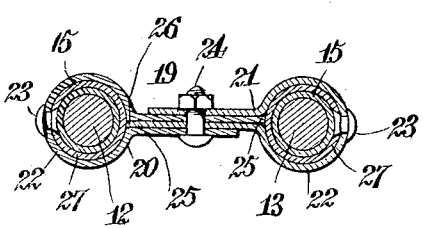

In the accompanying drawings:—Figure 1 is a side view of the wheel; Fig. 2 is a sectional perspective view thereof; and Fig. 3 is a section on the line 3—3 of Fig. 1.

The wheel comprises a felly 1 having an inwardly-extending flange 2 and a tire receiving channel 3, the latter having fitted and secured therein a cushion tire 4 of any suitable well known form. Concentric with the rim 1 is a hub 5 which includes relatively spaced disks or rings 6, each having a peripheral flange 7.

Between the felly and the hub are mounted spokes 8 comprising outer sections 12 and 13 alined and alined sections 13 and 14. The sections 11 and 14 have brazed or otherwise suitably secured thereto metallic guide tubes 15, each having mounted therein one or more coiled springs interposed between the companion spoke members of each element and operating to exert their force thereagainst to normally hold the elements distended relatively. The section 12 of each spoke is offset at 16 in the direction of the flange 2 of the felly 1, being horizontally alined with the adjacent section 13 of the spoke and receiving therewith a bolt 17, which is passed through said flange 2, as shown in Fig. 2, thus forming a pivotal mounting therefor at the felly. The spokes are arranged in companion groups and as shown in Fig. 1, the spokes of one group are extended in an opposite direction from the spokes in the other group, while each spoke is disposed at a tangent to the hub 5. The section 11 of one spoke is extended through the space between the sections 11 and 14 of the spoke of the adjacent group, as clearly shown in Fig. 2. At the inner ends, the sections 11 and 14 are connected pivotally by bolts 18 with the peripheral flanges 7 and 7ª, respectively, of the hub 5, one of the bolts 18 forming a connection for the section 11 of one spoke and the section 14 of an adjacent spoke, also see Fig. 2.

The tubes 15 of each spoke are connected with each other by braces 19, and as shown these braces are formed of identical metallic strips 20 and 21 each rolled to provide a cylindrical portion 22, through which the adjacent tube 15 is projected and secured as at 23. The overlapping free portions of the materials 20 and 21 are secured together by bolts 24, while one of the free portions is extended, as at 25 in the direction of the adjacent spoke member and mutually engaged therewith as at 26 so as to form an effective brace therefor, as will be understood. The sections 12 and 13 of each of the spokes are embraced substantially throughout their length with steel casings 27.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as claimed.

Having thus described my invention, what I claim is:—

In a vehicle wheel, a hub, a felly, a plurality of groups of spokes interposed between the felly and the hub and each arranged in a tangent to the latter, the spokes of one group being extended at an opposite angle to the spokes of the other group, each of the spokes comprising pairs of parallel arranged inner and outer sections, tubes carried by the inner sections and slidably receiving the outer sections, yieldable means between the inner and outer sections and inclosed by the tubes, and devices interposed between the tubes and having portions embracing the same and secured thereto and comprising substantially identical plates having overlapping ends secured together between the tubes and having portions arranged with longitudinal edges bearing against the tubes.

In testimony whereof I affix my signature in presence of two witnesses.

ARCH MOON.

Witnesses:
F. P. STRASSBURG,
C. B. AUSTIN.

Copies of this patent may be obtained for five cents each, by addressing the "Commissioner of Patents, Washington, D. C."